United States Patent [19]
Gastiger et al.

[11] Patent Number: 5,785,738
[45] Date of Patent: Jul. 28, 1998

[54] PROCESS AND PLANT FOR TREATMENT OF A GAS MIXTURE INCLUDING OZONE

[75] Inventors: Michel Gastiger, Orsay; Philippe Renault, Versailles, both of France

[73] Assignee: L'Air Liquide, Societe Anonyme Pour L'Etude et L'Exploitation des Procedes Georges Claude, Paris, France

[21] Appl. No.: 578,946

[22] Filed: Dec. 27, 1995

[30] Foreign Application Priority Data

Dec. 27, 1994 [FR] France .................. 94 15716

[51] Int. Cl.$^6$ ........................... B01D 53/04
[52] U.S. Cl. .................. 95/12; 95/104; 95/106; 95/138; 96/111; 96/130; 96/144
[58] Field of Search ............ 95/97–99, 104–106, 95/138, 8, 11, 12; 96/111, 121, 122, 126–128, 130, 133, 144; 423/219, 581

[56] References Cited

U.S. PATENT DOCUMENTS

| | | | |
|---|---|---|---|
| 2,872,397 | 2/1959 | Kiffer | 204/176 |
| 3,037,338 | 6/1962 | Thomas | 95/104 |
| 3,134,656 | 5/1964 | Donohue et al. | 95/138 |
| 4,280,824 | 7/1981 | Lassmann et al. | 95/138 X |
| 4,604,279 | 8/1986 | Leitzke et al. | 423/581 |
| 4,786,489 | 11/1988 | Grenier et al. | 95/138 X |
| 5,039,314 | 8/1991 | Lehner et al. | 95/138 X |
| 5,507,957 | 4/1996 | Garrett et al. | 95/138 X |

FOREIGN PATENT DOCUMENTS

| | | | |
|---|---|---|---|
| 0 178 415 | 4/1986 | European Pat. Off. | |
| 36 28 236 | 2/1988 | Germany | |
| 4314942 | 11/1994 | Germany | 95/138 |
| 52-039793 | 10/1977 | Japan | 95/138 |
| 55-020267 | 2/1980 | Japan | 95/104 |
| 3-016638 | 1/1991 | Japan | 95/138 |

*Primary Examiner*—Robert Spitzer
*Attorney, Agent, or Firm*—Burns, Doane, Swecker & Mathis, LLP

[57] ABSTRACT

A process for treatment of a secondary gas including ozone, comprising the steps of:

a) adding an adjacent gas including $CO_2$ to the secondary gas to form a mixture of secondary gas and adjacent gas;

b) passing the mixture of secondary gas and of adjacent gas obtained at the end of stage a) into at least one stock of adsorbent, where the ozone is completely or partly adsorbed;

c) sweeping the stock of adsorbent with the aid of a desorbing gas including $CO_2$, and discharging from an outlet of the stock an output gas including ozone, wherein the ozone has a concentration which is higher in the output gas than the ozone concentration of the secondary gas.

38 Claims, 4 Drawing Sheets

PROCESS AND PLANT FOR TREATMENT OF A GAS MIXTURE INCLUDING OZONE

BACKGROUND OF THE INVENTION (i) Field of the Invention

The invention relates to a process for treatment of a gas mixture including ozone, with a view to obtaining at the outlet of the process an output gas in which the concentration of ozone is higher than the initial concentration in the gas mixture.

BACKGROUND OF THE INVENTION

Because of its high oxidizing power, ozone has been very widely referred to and tested for many applications, including: water treatment, disinfection and bleaching operations, or else as a reactant in the manufacture of peroxides and other organic acids.

This compound is traditionally obtained from mixtures containing oxygen, in a cold plasma of the corona discharge type.

In the stationary state a mixture is then obtained in which the ozone concentration is relatively low (typically a few % by volume), the yield of ozone being appreciably improved when the oxygen concentration of the mixture initially treated is increased.

(ii) Description of the Related Art

Many investigations have been performed and published, over several decades, tending to increase the quantity of ozone produced in a gaseous mixture or else to concentrate it. These investigations had a twofold objective: bearing in mind the intended applications, to increase the observed oxidation kinetics, but also, furthermore, to try to separate off the oxygen present in the mixture produced, so as to recycle it, this being both for economic reasons and for reasons related to safety.

The methods envisaged by these various investigations can be divided into two categories:

- a first category where attempts have been made to increase the quantity of ozone produced by modifying the ozonization operation itself, and
- a second category where the mixture produced by the ozonizer has been reprocessed.

In the case of the first category of methods it is possible to mention a first example relating to the use of pure oxygen as a replacement for air, which increases the ozone concentrations obtained in the mixture produced by a factor close to two.

It is also possible to mention in this first category other investigations aiming at modifying the geometrical parameters of the electrode of the corona discharge or else the electrotechnical parameters of the discharge.

In the case of the second category of methods, numerous investigations have been carried out over the last thirty years, related to the capacity for the adsorption of ozone on some supports (most particularly silica gel). These investigations made use of cycles of adsorption of ozone produced by the ozonizer when the mixture was passed over the support, and the desorption of this adsorbed ozone by drawing off under vacuum or by the use of a sweeping gas (air or nitrogen).

In the case of a stage of desorption by drawing-off under vacuum, giving rise to the production of a gas mixture of high ozone purity, or even pure ozone, the case of the documents EP-A-103,144 or else EP-A-178,415 may be mentioned. It should be noted that the application of a stage of desorption by drawing-off under vacuum represents a degree of complication, as well as an additional cost of implementation.

After all, obtaining mixtures which are highly concentrated in ozone, or even pure ozone, is not always either useful or desirable, especially for safety reasons.

With regard to methods making use of an operation of desorption with the aid of a sweeping gas, it is possible to mention the documents FR-A-2,580,271 and the article published on the occasion of the Eighth World Congress on Ozone which was held on 15–18 Dec. 1987 in Zurich (Unionsverlag publishers, Zurich, pages A72 to A86), both in the name of Assignee, where a process for the production of ozone of the abovementioned type (absorption/desorption cycles) is proposed, the desorption operation being obtained by purging with air or nitrogen. The article furthermore refers to the possibility of obtaining a slight concentration effect (ozone concentration of the gas mixture produced slightly higher than the ozone concentration of the mixture originating from the ozonizer), this being done by modifying the pressure difference adopted for the desorption and adsorption stages. It should be noted, however, that, since the pressure ratio which can be used is necessarily small, the concentration effect obtained is equally limited.

It is also possible to mention in this category of desorption using gas purging, the investigations by the company Union Carbide Corporation, reported in document U.S. Pat. No. 2,872,397, where the successive operations of adsorption and of desorption with nitrogen which are carried out make it possible to recover, according to this document, approximately 90% of the ozone produced by the ozonizer.

Still in this second category of methods, where the $O_2/O_3$ mixture produced is reprocessed, it is also possible to mention the case where this mixture is trapped in liquid nitrogen, the subsequent separation of the two components being performed by distillation. In this latter case it is then possible to make the same comments as those which have already been expressed above in the case of the concentration by drawing-off under vacuum after the adsorption stage (i.e. complexity, cost, safety and, quite frequently, the pointlessness of having available a mixture so concentrated in ozone).

SUMMARY AND OBJECTS OF THE INVENTION

The objective of the present invention is to provide a process for treatment of a gas mixture including ozone (such as, for example, obtained at the exit of an ozonizer or else originating from a storage), the characteristics of which are the following:

- the process aimed at must make it possible to obtain a significant concentration effect (ozone concentration at the outlet of the process which is higher than the ozone concentration in the initial gas mixture treated) while avoiding any use of vacuum or of low pressures,
- this process must be easy and economical to implement (therefore making it possible especially to save oxygen),
- it must also have an excellent flexibility and modulability, to make it possible, according to the intended application, to obtain ozone concentrations which are variable and adjustable from a few % of ozone in a carrier gas up to several tens of % of ozone in this carrier gas,
- it must furthermore be compatible with the essential safety requirements which are generally followed on industrial sites.

The investigations successfully concluded Applicants have shown that it is possible to obtain such a concentration phenomenon, and within the constraining conditions listed above, by the combined use of the following stages:

- a stage of adsorption of the gaseous medium (for example of the mixture produced by an ozonizer) on a suitable support (in particular silica gel),
- a stage of desorption of the adsorbed ozone with a stream including $CO_2$.

The fundamental point which these investigations have revealed is that $CO_2$ does not act merely as a sweeping carrier gas (as the nitrogen or air which are conventionally employed could do), but that it creates what can be described as a "piston" effect which will be illustrated later in the context of examples.

While being adsorbed itself, the $CO_2$ desorbs, in step therewith, the ozone previously adsorbed, thus pushing a kind of ozone front which moves forward inside the stock of adsorbent.

These investigations have shown, furthermore, that the presence of $CO_2$ in the gas originating from the desorption stage, which contains ozone, has a very positive effect on the stabilization of the ozone molecule (limitation of its decomposition), and this is of advantage, both in the case where it is desired to store the ozone in an intermediate gas storage, and for the problem of industrial piping. It has thus been possible to observe gains in stability in gaseous $CO_2$, in comparison with storage in pure oxygen, for example after 17 hours, which can reach a factor of 3 according to the pressures used in practice.

Furthermore, Applicants have found that it is advantageous to add a gas which can be referred to as an adjacent gas, which includes $CO_2$, to the gas to be treated, before it reaches the adsorption bottle.

The $CO_2$ then intervenes in such a configuration both during the adsorption stage and during the desorption stage.

The presence of $CO_2$ during the adsorption stage allows especially a better control and adjustment of the ozone concentration which is required in the final gas.

The process for treatment of a secondary gas including ozone, according to the invention, therefore includes the following stages:

a) a gas which may be referred to as an adjacent gas, which includes $CO_2$, is added to the secondary gas;
b) the mixture of secondary gas and of adjacent gas thus formed is passed into at least one stock of adsorbent, where the ozone is completely or partly adsorbed;
c) the stock of adsorbent is swept with the aid of a desorbing gas including $CO_2$, to obtain at the exit of the stock an output gas including ozone, the ozone concentration of the output gas being higher than the ozone concentration of the secondary gas.

The residue of the mixture consisting of the secondary gas and the adjacent gas, which is not adsorbed, obtained at the outlet of the adsorption bottle is then advantageously discharged to the outside or else recycled as a source of $O_2$, for example to the entry of the ozonizer (when the source of secondary gas including ozone is an ozonizer) or else as a source of $CO_2$ for the adsorption or desorption stage (especially in the cases where the mixture in question includes little oxygen).

As noted above, the secondary gas to be treated may, for example, have been obtained at the outlet of an ozonizer, where a primary gas including oxygen has been treated, or else may originate from an intermediate storage.

According to one of the embodiments of the invention, before the adsorption stage b), a preparation (or conditioning) of the adsorbent will have been carried out by purging it with the aid of a conditioning gas which includes $CO_2$.

As will be clearly apparent to a person skilled in the art, the process according to the invention may be carried out with the aid of a number of stocks (a term which is also frequently used is bottles) of adsorbent in parallel, one of the adsorption stocks being, for example, in an adsorption stage while another stock, having previously undergone the adsorption stage, is in a stage of desorption with the aid of a desorbing gas, and so on.

In the case of a source of secondary gas consisting of an ozonizer, the primary gas including oxygen may, for example, consist of air, of pure oxygen or an air/oxygen mixture, or else a gas such as obtained at the outlet of a generator for air separation by adsorption or permeation.

Applicants have been able to ascertain that, with a view to improving the ozone production efficiency of the ozonizer, it is advantageous to treat a primary mixture containing a certain quantity of nitrogen, for example a few %.

The term "ozonizer" must be seen as denoting any type of apparatus producing a mixture containing ozone, from an initial mixture containing oxygen, as is the case, for example, with ozonizers based on the creation of a plasma by corona discharge.

The adsorbent bottle will be advantageously thermally insulated from the surrounding atmosphere, for example by systems of intermediate walls filled with materials such as perlite, if appropriate evacuated, as is the common practice in the industry dealing with the storage of cryogenic liquids.

According to the result sought after, the secondary gas may be employed as it is, originating from the source of secondary gas, and therefore in most cases at a temperature close to the ambient temperature. According to one of the embodiments of the invention, it may also be cooled before it reaches the adsorption stock.

The temperature of the cooled secondary gas will then be advantageously in the range between −80° C. and 10° C., or even in the range between −80° C. and 0° C.

The stage of cooling may be performed before or after the addition of adjacent gas.

This cooling may be performed, for example, by conventional means such as mechanical cold, exchanger with a cryogenic liquid or else decompression operation on a turbine.

It will also be possible to envisage gas/gas exchangers, in which one of the paths will be employed to carry through the secondary gas (or else secondary gas/adjacent gas mixture) to be cooled and another path will be, for example, employed to carry through the desorbing gas which may advantageously originate from a liquid $CO_2$ storage, and which will therefore have negative calories to release.

It may be noted that, according to the cases, it will be advantageous to employ a three-path exchanger, by employing the third path for recycling the residue of unadsorbed gas obtained at the outlet of the bottle, which is found to be relatively "cold".

If the direction of travel of the gas inside the bottle during the adsorption stage is called "co-current" (the residue of unadsorbed gas being therefore obtained at the co-current outlet of the bottle), then the desorption stage may be performed by co-current or else countercurrent sweeping.

In the case of countercurrent desorption sweeping: the output gas including ozone is therefore obtained at a countercurrent outlet of the bottle.

In the case of a co-current desorption sweeping the output gas including ozone is therefore obtained at a concurrent outlet of the bottle.

In some cases, according to the envisaged operation (for example in a batch or cyclic mode, and the like), after stage c), a stage of regeneration of the adsorbent of the adsorption bottle previously employed will be advantageously carried out, for example by one of the following methods: heating the adsorbent, drawing-off under vacuum or else purging the adsorbent with the aid of a tool gas (in any direction of travel of the gas inside the bottle), a tool gas which may be, for example, an inert gas.

The gas obtained during and at the end of this regeneration stage, which is laden with $CO_2$, will be advantageously recycled in order to be reused, for example for the desorption stage referred to above, or else for the conditioning stage.

It can be seen, therefore, that it may become necessary to use a number of bottles of absorbent, one of the adsorption stocks being, for example, in a conditioning stage while another stock, already conditioned, is in an adsorption stage and while a third stock, having previously undergone the adsorption stage, is in a stage of desorption with the aid of a desorbing gas, and so on.

On this subject of multiple bottles conventionally involved in adsorption/desorption cycles, reference will be made to document FR-2,580,271, already mentioned, which refers especially to the periodic use of a bottle for the purification of purge gases.

The process according to the invention makes it possible, in a modulable manner, to vary the intensity of the concentration phenomenon, and therefore to vary the ozone concentration in the output gas obtained, according to the envisaged oxidation application. It has thus been shown successfully that it is possible to obtain concentration ratios of at least 2, or even at least 4 or more (thus enabling concentrations of several tens of % to be attained).

The adjacent gas according to the invention is advantageously pure $CO_2$ or a mixture of nitrogen and of $CO_2$ or a mixture of oxygen and of $CO_2$ or else of air and of $CO_2$ or, more generally, a mixture comprising $CO_2$ and any other gas which is adsorbed very weakly on the envisaged support (such as the inert gases).

According to each user's case, the ozone-rich output gas obtained according to the invention may be equally well led directly toward a user station, as well as, for example:

toward a gas storage for use in the following hours (the significant effect of stabilization of ozone in the gaseous state in mixtures comprising $CO_2$ was referred to above);

or else toward a receiver where the $CO_2/O_3$ mixture produced is cryotrapped (liquefied $CO_2$ and $O_3$ stored in the dissolved state in this $CO_2$), for example by the use of conditions of the type of a pressure of a few bar (a few $10^5$ Pa) and a temperature close to $-50°$ C.

In fact, besides the investigations which Applicants have brought to a successful conclusion, which were referred to earlier in this application and which have demonstrated the positive influence of the presence of $CO_2$ on the stabilization of the ozone molecule in a gaseous mixture (limitation of its decomposition), Applicants have also conducted other investigations which have demonstrated the high solubility of ozone in liquid $CO_2$ (in comparison with what has traditionally been tested and obtained in liquid nitrogen or else in compounds of the CFC type, for example Freon).

It has thus been demonstrated that, in comparison with solubilities which are traditionally obtained in liquid oxygen or in liquid nitrogen, it is possible to obtain improved solubilities in liquid $CO_2$ (which are increased by factors that can reach 5 or even 7), thus approaching the good results for the solubility of ozone in some CFCs, CFCs which, as is known, are subject to drastic restrictions on an international scale for environmental reasons.

These solubility results therefore open up an additional and attractive possibility of storage of the ozone produced.

According to the applications considered, it may be advantageous to subject the ozone concentration obtained in the output gas to servo control. This servo control may, for example, be obtained by one of the following methods:

by dilution when the ozone concentration measured in the output gas is higher than a specified set point;

by modifying, according to the measured value of the ozone concentration of the output gas, the following adsorption/desorption cycle (for example by modifying the oxygen concentration at the entry of the ozonizer, if it is the source of secondary gas, the pressure of the gas during the adsorption and/or desorption stages, the $CO_2$ concentration employed during the adsorption and/or desorption stages or else a combination of some of these actions).

It would also be possible to vary the temperature parameter (especially the delta of temperature existing between the adsorption and desorption stages) but this means offers a higher reaction time (thermal inertia).

When the secondary gas originates from an ozonizer, a secondary gas pressure generally situated in the range extending from atmospheric pressure to 2 bars absolute will be available, but this pressure may in some cases be much higher, even reaching 10 bars.

With regard to the desorbing gas, a pressure which is between the atmospheric pressure and the pressure of the secondary gas/adjacent gas mixture will generally be employed during the adsorption stage. According to one of the alternative forms of the invention, the pressure of the desorbing gas is higher than the pressure of the secondary gas/adjacent gas mixture, this alternative form making it possible to combine the "concentrator" effect obtained according to the invention with the pressure, this being aimed at some applications of ozone for which a relatively elevated pressure would be advantageous.

The invention also relates to a plant for treatment of a secondary gas including ozone, including in series along at least one main gas line:

a source of secondary gas to be treated;

at least one stock of adsorbent;

a source of desorbing gas which includes $CO_2$, connected to the main line by a so-called desorption line at a point in the main line which is situated between the source of secondary gas and the stock of adsorbent, which additionally includes a source of adjacent gas which includes $CO_2$, connected to the main line by a so-called adjacent line at a point in the main line which is situated between the source of secondary gas and the stock.

The source of secondary gas may, for example, consist of an ozonizer producing the secondary gas from a primary gas including oxygen, or else of an intermediate storage of the secondary gas including ozone.

According to one of the embodiments of the invention the plant furthermore includes means for cooling a gas, situated between the source of secondary gas and the stock of adsorbent, upstream or downstream of the point of connection of the desorption line to the main line and upstream or downstream of the point of connection of the adjacent line to the main line.

As mentioned above, the means for cooling employed may consist, for example, of conventional means such as mechanical cold, an exchanger with a cryogenic liquid or else a decompression operation on a turbine. Gas/gas exchangers with at least two paths may also be envisaged, in which one of the paths will be employed to carry through the gas to be cooled and another path will be, for example, employed to carry through the desorbing gas which may advantageously originate from a liquid $CO_2$ storage and which will therefore have negative calories to release.

The plant will be supplemented, if appropriate, by means which are necessary for the servo control of the ozone concentration obtained in the output gas, in relation to a specified set point value, such as analyzers, valve systems, whether manual or automatic (especially remotely controllable, for example via a programmable logic controller) and flow controllers, permitting the dilution of the output gas when the ozone concentration in the output gas is higher than the set point, or other means making it possible to modify, for example, at least one of the parameters of the adsorption/desorption cycles (the oxygen concentration in the primary gas when the source of secondary gas is an ozonizer, the $CO_2$ concentration in the desorbing gas and/or the adjacent gas, the pressure of the secondary gas and the pressure of the desorbing gas). It will thus be possible to employ a variable source of primary gas or else to vary the production conditions of an oxygen generator using permeation or adsorption, so as to vary the oxygen concentration in the mixture obtained at the generator outlet.

Similarly, it will be possible to vary the composition of the adjacent gas by the use of different sources of $CO_2$ or else by dilution of the same single source of $CO_2$.

BRIEF DESCRIPTION OF THE DRAWINGS

Other characteristics and advantages of the present invention will emerge from the following description of embodiments which are given by way of illustration but without any limitation being implied and produced in relation to the attached drawings in which.

DESCRIPTION OF THE PREFERRED EMBODIMENTS

Figure 1:
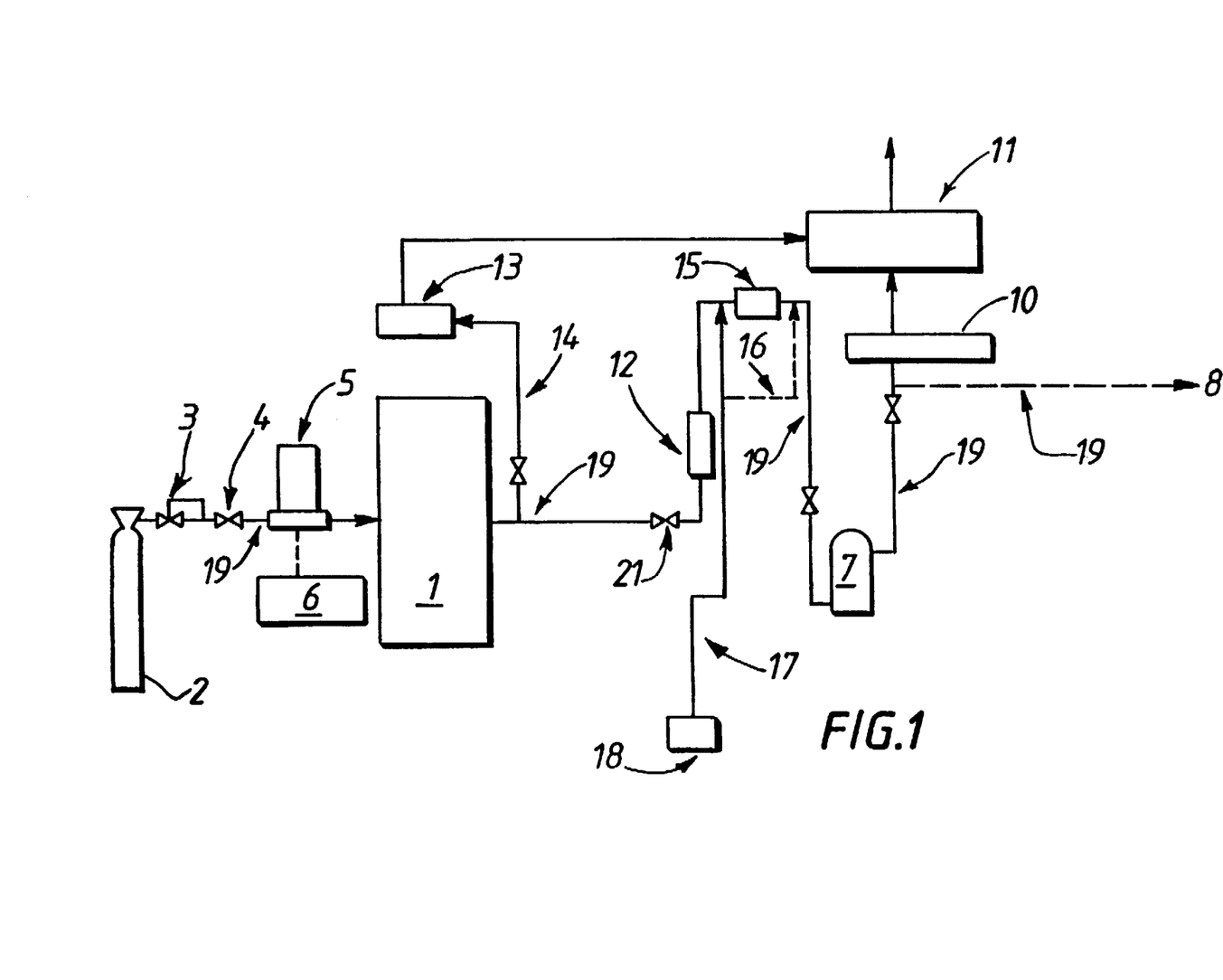
FIG. 1 is a diagrammatic view of a suitable plant for implementing the process according to the invention.

A source of oxygen 2 (constituting the primary gas) can be identified in FIG. 1, shown diagrammatically in the case of the embodiment illustrated in the form of a bottle (compressed gas storage), for example of air, oxygen or of a nitrogen/oxygen mixture, feeding, via a main line 19 and via an appropriate expansion system, valve system and other flow control (in this case expansion valve 3, valve 4 and mass flow regulator 5 controlled by its control cabinet 6), an ozonizer 1, of the type making use of a corona discharge.

The ozone concentration of the secondary gas obtained at the outlet of ozonizer 1 is, if appropriate, measured on the analyzer 13 by virtue of a branch connection 14 situated on the main line at the ozonizer outlet. The gas output from the analyzer is discharged toward the exterior, preferably via a detoxification system 11 (for example a system based on alumina promoting the decomposition of the ozone).

The secondary gas then reaches, via a system of valves and of flow control (21, 12), a means 15 for cooling (for example an exchanger with cryogenic liquid), where its temperature is lowered, preferably in the range of −80° C. to 10° C. and more preferably in the range of −80° to 0° C.

The presence of a desorbing gas line 17 will be noted, which is connected in its upstream part to a source 18 of gas including $CO_2$, which, as shown here, may be connected to the main line upstream of the cooling system or else downstream of this system via the bypass 16.

As will be clearly apparent to a person skilled in the art, this diagrammatic representation of lines 17 and 16, which are connected to a source including $CO_2$, may also be employed for supplying an adjacent gas comprising $CO_2$.

For the sake of simplification and legibility of the figure, only one part of the plant (source 18 comprising $CO_2$, lines 16/17) has therefore been employed for the delivery of adjacent gas and of desorbing gas, the connection of these supplies being therefore made upstream or downstream of the cooling means 15.

The source 18 of desorbing gas and/or of adjacent gas will be advantageously a storage of liquid $CO_2$ from which the cold gas emitted will be advantageously capable of donating its negative calories.

The cold secondary gas (or secondary gas/adjacent gas mixture) obtained at the outlet of the cooling means 15 is then led, still along the main line 19, toward an adsorption bottle 7 containing a silica gel, where all or part of the ozone of which it is composed is adsorbed and the residue of unadsorbed gas is, in the example shown, discharged toward the exterior, after having been subjected to passing through the detoxification system 11, if need be passing through an analysis stage 10.

During the following stage of desorption, with the aid of the desorbing gas 18, the output gas resulting therefrom at the bottle outlet 7 is sent via the downstream part of the line 19 toward the point 8, which, according to the cases, may represent a user station, a gas storage for use in the hours that follow (the significant effect of stabilization of ozone in the gaseous state in mixtures comprising $CO_2$ was referred to above) or else toward a receiver where the $CO_2/O_3$ mixture produced is cryotrapped.

Figure 2:
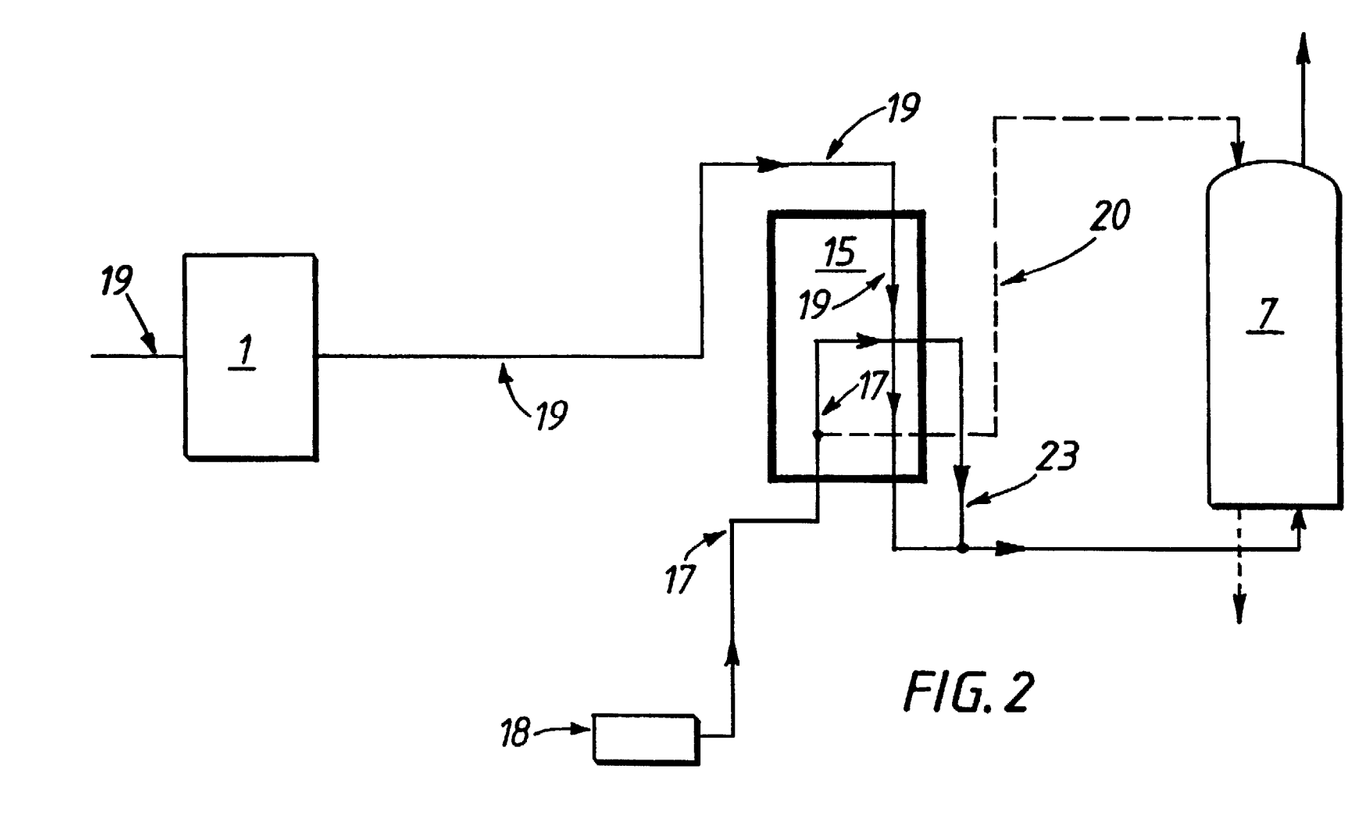
FIG. 2 shows diagrammatically an example of detail of the cooling operation in the case of the use of a twin-path exchanger.

FIG. 2 illustrates the particular case where the cooling means 15 employed is a gas/gas exchanger in which one of the paths is employed to carry through, via the line 19, the secondary gas originating from the ozonizer 1, before this mixture reaches the adsorption bottle 7, another path being employed to carry through the desorption (and/or adjacent gas) line 17 which, in the case shown, is connected to a liquid $CO_2$ storage 18 (in which the typical storage conditions are −20° C., 20 bar), it being possible for the cold gas resulting therefrom to then release its negative calories in the exchanger, for the benefit of the secondary gas.

The dotted line 20 shows the desorbing gas which is sent toward the top of the column 7. The solid line 23 shows the delivery of adjacent gas into the secondary gas, downstream of the exchanger, for the adsorption stage.

No triple-path exchanger has been shown in the case of this example, but it will be understood, as already mentioned above, that such a triple-path exchanger may be employed in some cases in order, additionally, to carry through the residue of unadsorbed gas recovered at the outlet of the adsorption bottle.

Figure 3:
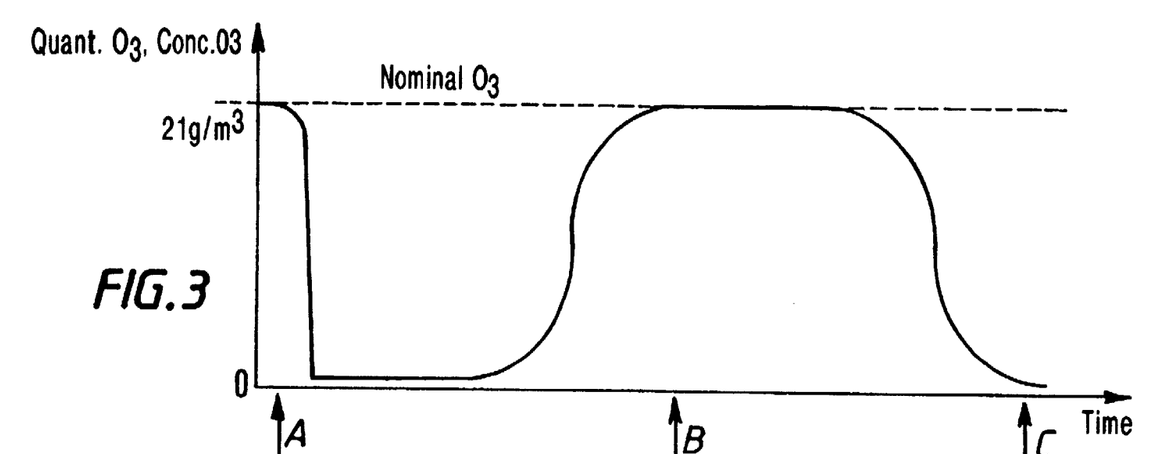
FIG. 3 shows diagrammatically the change in the ozone concentration at the adsorption bottle outlet as a function of time (during the adsorption and desorption stages, the desorption stage being carried out with nitrogen)

FIG. 3 illustrates diagrammatically the change in the ozone concentration (as ordinate) at the adsorption bottle outlet as a function of time as abscissa (and therefore during the adsorption and desorption stages), the desorption stage being carried out conventionally with nitrogen (or else air).

The figure can also be read in terms of "quantity of ozone obtained" (product of the concentration and of the flow rate at any instant).

Figure 4:
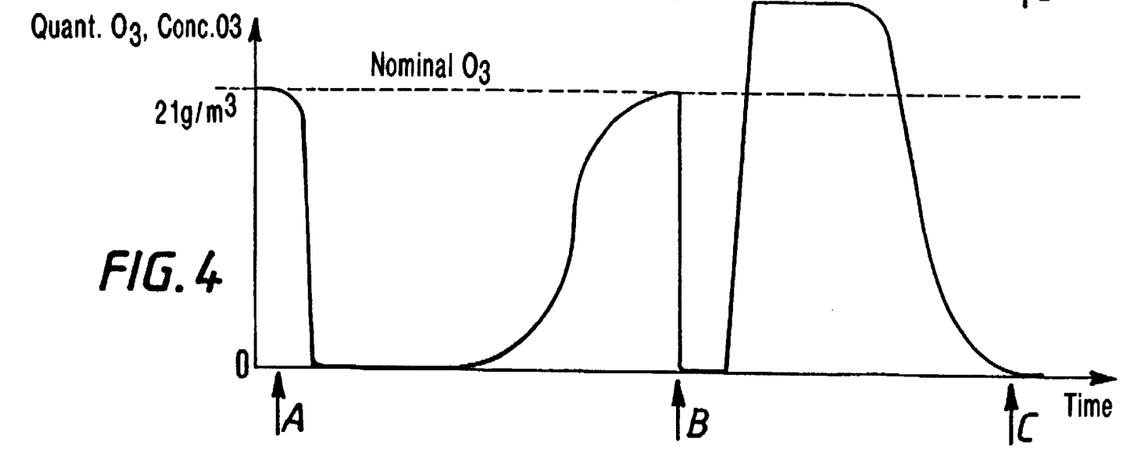
FIG. 4 shows diagrammatically the change in the ozone concentration at the adsorption bottle outlet as a function of time (during adsorption and desorption stages, the desorption stage being carried out with pure $CO_2$)
Figure 5:
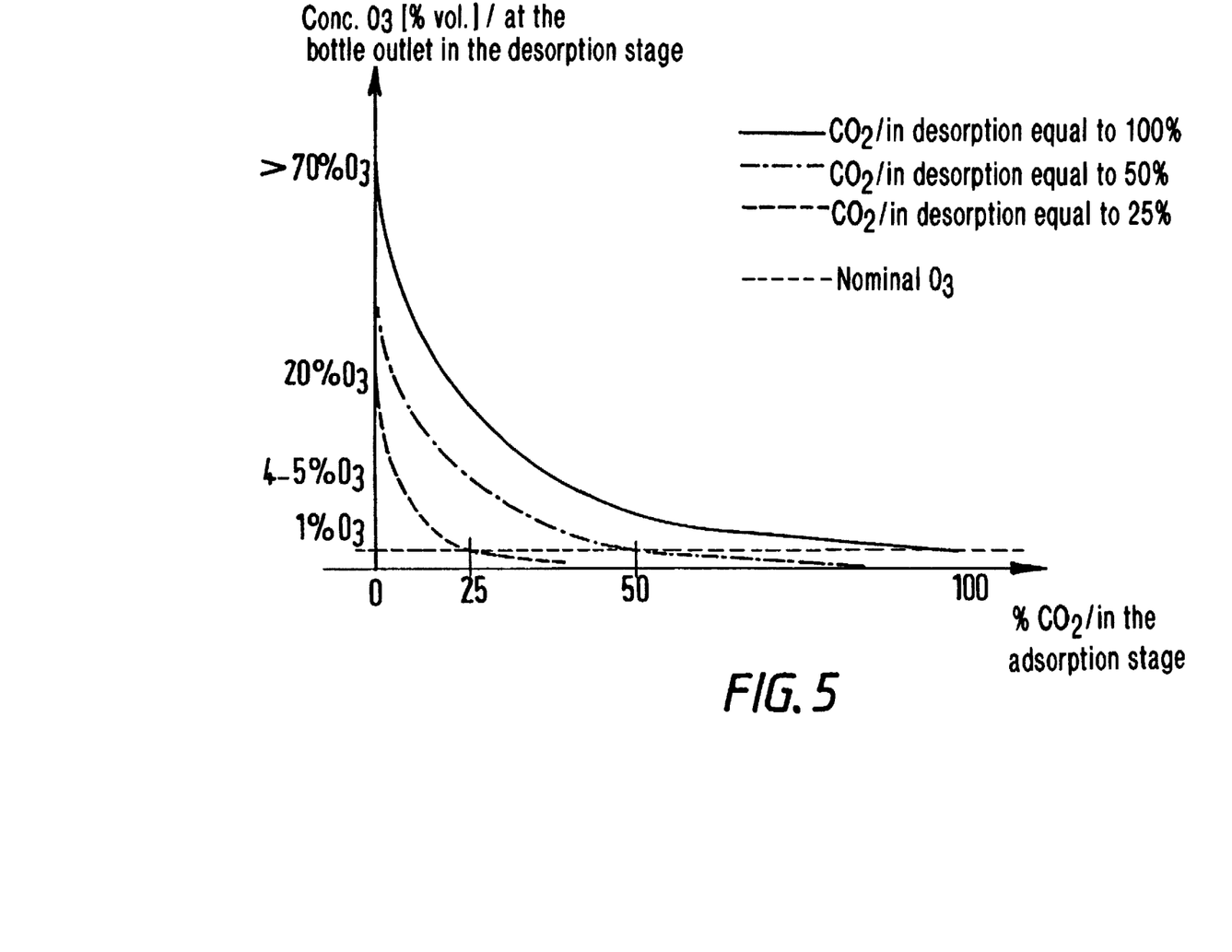
FIG. 5 shows the change in the ozone concentration peak at the absorption bottle outlet, as a function of the $CO_2$ concentration in the adsorption gas (the desorption stage being carried out under different $CO_2$ concentrations).

These tests (reported in FIG. 3), like those reported below in the context of FIGS. 4 and 5, were carried out with the aid of a plant such as that described in the context of FIG. 1, in the following conditions (the gaseous mixture to be adsorbed not being subjected to cooling in this case):

- an adsorption column made of 304L stainless steel, containing a charge of approximately 1 kg of silica gel (of Grace trademark, reference Grace 125) with a particle size varying from 1 to 3 mm;
- adsorption stage: an $O_2/O_3$ secondary mixture containing 1% by volume of ozone (in the case of FIGS. 4 and 5 with the addition of a $CO_2$ adjacent component) with an overall flow rate of the order of 40 Sl/h, at a temperature close to ambient temperature and at a pressure close to $1.1 \ 10^5$ Pa absolute; duration of this stage: from 35 to 40 min;
- desorption stage: whether involving nitrogen (FIG. 3) or mixtures including $CO_2$, or even with the aid of pure $CO_2$ (following figures), this stage used a flow rate of the order of 40 Sl/h, at a pressure varying slightly during this stage between atmospheric pressure and approximately $1.1 \ 10^5$ Pa absolute; duration of this stage: 25 to 30 min;
- in the case of the tests reported in FIGS. 4 and 5, a stage of conditioning of the adsorbent was carried out during the start-up, before the adsorption stage b), with the aid of a mixture containing, according to the cases, up to 75% of $CO_2$ in oxygen, at ambient temperature, at a pressure close to $1.1 \ 10^5$ Pa absolute, at a flow rate in the region of 40 Sl/h. The temperature of the adsorbent rises slightly during this stage (which lasts a few tens of minutes), in order to drop back slightly above the ambient temperature.

In FIG. 3 the arrowed point A places diagrammatically in the cycle the beginning of the adsorption, the arrowed point B the end of the adsorption and the beginning of the desorption with nitrogen, and the point C the end of the desorption stage.

The absence of a concentration phenomenon is therefore clearly ascertained in this figure, since during the desorption an ozone concentration is obtained which does not exceed the nominal concentration (in this case 21 g/m³) initially present in the secondary gas originating from the ozonizer.

The rapid drop after the point A in the ozone concentration detected at the outlet (since the ozone is adsorbed), until it reaches a zero, or at the very least a hardly detectable, concentration, will also be noted.

In the case of FIG. 4, where, with the same nominal value, a stage of desorption with pure $CO_2$ is used this time (the temperature increasing slightly as the front passes), an ozone concentration peak is clearly seen during the desorption stage, extending well above the nominal value.

As already mentioned, the value of this concentration peak (from a few % to several tens of %), as well as its shape, can be controlled (according to the intended applications), especially by modifying the parameters already listed.

Here again, to make the diagram easier to read, the arrowed point A places in the cycle the beginning of the adsorption, the arrowed point B the end of the adsorption and the beginning of the desorption with pure $CO_2$, and the point C the end of the desorption stage.

Similarly, here too, as discussed in greater detail below, this schematic diagram may, according to the curve sections, be read in terms of "ozone concentration" or in terms of "quantity of ozone".

The existence of a kind of short transient period can be seen in FIG. 4, starting at point B, where the absence of detection of ozone can be noted (this period lasting of the order of 7 to 8 min here), following the start of the desorption stage and before rising toward the peak.

During this transient period an extremely low quantity of ozone, due to a very low flow rate, is recovered at the bottle outlet.

This phenomenon confirms the "piston" effect referred to above, the $CO_2$, while being adsorbed itself, desorbs, in step therewith, the ozone previously adsorbed, thus pushing a kind of ozone front which moves forward inside the stock of adsorbent.

It can be seen, therefore, that, while the remainder of FIG. 4 can be read without difficulty both in terms of "concentration" and in terms of "quantity", the change in the curve at the transient period must, in order to be understood, be read rather in terms of a quantity of ozone which is produced.

The characteristics of this transient effect noted here between the beginning of the desorption stage and the concentration peak will be especially a function of the ratio of the $CO_2$ concentration in the desorbing gas to the $CO_2$ concentration in the secondary gas/adjacent gas mixture.

FIG. 5 therefore illustrates the change in the ozone concentration peak at the outlet of the adsorption bottle as a function (as abscissa) of the $CO_2$ concentration in the adsorption gas mixture (via the contribution of adjacent gas), the desorption stage being carried out at different concentrations of $CO_2$ in oxygen (25%, 50%, 100%).

These changes illustrate the influence of a large presence of $CO_2$ in the desorbing gas.

Bearing in mind these results, which are, of course, representative of the adsorption and desorption pressure conditions employed, emphasis will be placed, when $CO_2$ is also employed in an adsorption stage, on preferentially ensuring a ratio of $CO_2$ concentration in desorption gas/$CO_2$ concentration in the mixture of secondary gas and of adjacent gas which is higher than 1.

As will be clearly apparent to a person skilled in the art on seeing all the alternative forms of the invention which have just been described, the output gas obtained may be of very varied composition, for example according to the adjacent gas and desorbing gas compositions employed. It may thus be binary ($O_3/CO_2$) or ternary (for example $O_3/CO_2/O_2$ or else $O_3/CO_2/N_2$ etc.) or even more complex.

Although the present invention has been described in relation to particular embodiments, it is, however, not limited thereby but is, on the contrary, capable of modifications and alternative forms which will become apparent to a person skilled in the art.

What is claimed is:

1. A process for treatment of a secondary gas including ozone, comprising the steps of:
    a) adding an adjacent gas including $CO_2$ to the secondary gas to form a mixture of secondary gas and adjacent gas;

b) passing the mixture of secondary gas and of adjacent gas obtained at the end of step a) into at least one stock of adsorbent, where the ozone is completely or partly adsorbed;

c) sweeping said stock of adsorbent with the aid of a desorbing gas including $CO_2$, and discharging from an outlet of said stock of adsorbent an output gas including ozone, wherein said ozone has a concentration which is higher in said output gas than the ozone concentration of said secondary gas.

2. The process as claimed in claim 1, further comprising the step, before step b), of sweeping said adsorbent with a conditioning gas including $CO_2$.

3. The process claimed in claim 1, wherein the ratio of the ozone concentration in said output gas to the ozone concentration in said secondary gas is at least 2.

4. The process as claimed in claim 1, wherein the ratio of the $CO_2$ concentration in the desorbing gas to the $CO_2$ concentration in the mixture comprising the secondary gas and the adjacent gas is higher than 1.

5. The process as claimed in claim 1, wherein (i) the desorbing gas and (ii) the mixture of secondary gas and adjacent gas have pressures such that the pressure of the desorbing gas is higher than the pressure of the mixture of secondary gas and of adjacent gas.

6. The process as claimed in claim 1, wherein said adjacent gas comprises pure $CO_2$, a mixture of $N_2/CO_2$, a mixture of oxygen/$CO_2$ or a mixture of air/$CO_2$.

7. The process as claimed in claim 1, further comprising cooling said secondary gas before it reaches said stock of adsorbent.

8. The process as claimed in claim 7, wherein the temperature of the cooled secondary gas is in the range between $-80°$ C. and $10°$ C.

9. The process as claimed in claim 7, wherein said step of cooling is performed after the step a) of adding said adjacent gas.

10. The process as claimed in one of claims 7 to 9, wherein the step of cooling the secondary gas or the mixture of secondary gas and of adjacent gas is carried out by passing said secondary gas or mixture of secondary gas and adjacent gas through an exchanger with at least two paths, the second path being employed for carrying through said desorbing gas.

11. The process as claimed in claim 10, wherein said exchanger comprises at least three paths, the process further comprising the step of carrying through in the third path of the exchanger a residue of the mixture of secondary gas and of adjacent gas which is not adsorbed by said stock of adsorbent and recovering said residue at the outlet of said stock of adsorbent and recycling said residue toward the exchanger.

12. The process as claimed in claim 1, further comprising subjecting the ozone concentration in the output gas to servo control in relation to a specified set point value.

13. The process as claimed in claim 12, comprising servo-controlling said ozone concentration in the output gas by dilution.

14. The process as claimed in claim 12 comprising servo-controlling said ozone concentration in the output gas by modifying $CO_2$ concentration in the desorbing gas and/or the adjacent gas, pressure of the secondary gas or pressure of the desorbing gas.

15. The process as claimed in claim 1, wherein said secondary gas is obtained at the outlet of an ozonizer, where a primary gas including oxygen has been treated.

16. The process as claimed in claim 15, further comprising servo-controlling the ozone concentration in the output gas by modifying oxygen concentration in said primary gas.

17. The process as claimed in claim 1, wherein said adsorbent is a silica gel.

18. The process as claimed in claim 1, further comprising leading the output gas obtained toward a user station, storing the output gas in a gaseous state or leading the output gas toward a liquid $CO_2$ storage, where it is dissolved.

19. A plant for treatment of a secondary gas including ozone comprising in series along at least one main gas line:

a source of secondary gas to be treated;

at least one stock of adsorbent;

a source of desorbing gas which includes $CO_2$, connected to the main line by a desorption line at a point in the main line which is situated between the source of secondary gas and said stock of adsorbent, a source of adjacent gas which includes $CO_2$, the source of adjacent gas being the same as or separate from the source of desorbing gas, and being connected to the main line by an adjacent line at a point in the main line which is situated between the source of secondary gas and said stock of adsorbent, the adjacent line being the same as or separate from the desorption line.

20. The plant as claimed in claim 19, wherein means for cooling a gas are placed between the source of secondary gas and said stock of adsorbent, upstream or downstream of the point of connection of the desorption line to the main line and upstream or downstream of the point of connection of the adjacent line to the main line.

21. The plant as claimed in claim 20, wherein said means for cooling comprises an exchanger with at least two paths, one of these paths being capable of carrying through said secondary gas, the other path being capable of carrying through said desorbing gas.

22. The plant as claimed in claim 19, wherein said source of secondary gas is an ozonizer producing said secondary gas from a primary gas including oxygen.

23. The plant as claimed in claim 19, wherein the source of desorbing gas and/or adjacent gas is a liquid $CO_2$ storage.

24. The plant as claimed in one of claims 19 to 23, wherein the source of desorbing gas comprises pure $CO_2$.

25. A plant for treatment of a secondary gas including ozone, comprising:

a source of secondary gas to be treated and at least one stock of adsorbent in series along at least one main gas line;

a source of desorbing gas which includes $CO_2$, connected by a desorption line to allow sweeping of said stock of adsorbent with said desorbing gas;

a source of adjacent gas which includes $CO_2$, the source of adjacent gas being the same as or separate from the source of desorbing gas, and being connected to the main line by an adjacent line, which is the same as or separate from the desorption line, at a point in the main line which is situated between the source of secondary gas and said stock of adsorbent, such that a mixture can be formed of the secondary gas and the adjacent gas.

26. The plant as claimed in claim 25, wherein the adsorption line and the desorption line are configured such that the stock of absorbent can be swept with the desorbing gas in a cocurrent manner with respect to a flow direction of the mixture of the secondary gas and the adjacent gas.

27. The plant as claimed in claim 26, wherein the source of desorbing gas comprises pure $CO_2$.

28. The plant as claimed in claim 25, wherein the adsorption line and the desorption line are configured such that the stock of absorbent can be swept with the desorbing gas in a countercurrent manner with respect to a flow direction of the mixture of the secondary gas and the adjacent gas.

29. The plant as claimed in claim 28, wherein the source of desorbing gas comprises pure $CO_2$.

30. The plant as claimed in claim 25, wherein means for cooling a gas are placed between the source of secondary gas and said stock of adsorbent, upstream or downstream of the point of connection of the desorption line to the main line and upstream or downstream of the point of connection of the adjacent line to the main line.

31. The plant as claimed in claim 30, wherein said means for cooling comprises an exchanger with at least two paths, one of these paths being capable of carrying through said secondary gas, the other path being capable of carrying through said desorbing gas.

32. The plant as claimed in claim 31, wherein the source of desorbing gas comprises pure $CO_2$.

33. The plant as claimed in claim 30, wherein the source of desorbing gas comprises pure $CO_2$.

34. The plant as claimed in claim 25, wherein said source of secondary gas is an ozonizer producing said secondary gas from a primary gas including oxygen.

35. The plant as claimed in claim 34, wherein the source of desorbing gas comprises pure $CO_2$.

36. The plant as claimed in claim 25, wherein the source of desorbing gas and/or of adjacent gas is a liquid $CO_2$ storage.

37. The plant as claimed in claim 36, wherein the source of desorbing gas comprises pure $CO_2$.

38. The plant as claimed in claim 25, wherein the source of desorbing gas comprises pure $CO_2$.

* * * * *

UNITED STATES PATENT AND TRADEMARK OFFICE
CERTIFICATE OF CORRECTION

PATENT NO. : 5,785,738
DATED : July 28, 1998
INVENTOR(S) : Michel GASTIGER et al It is certified that error appears in the above-indentified patent and that said Letters Patent is hereby corrected as shown below:

Kindly amend Claims 26 and 28 as follows:

26.  The plant as claimed in claim 25, wherein the [adsorption] <u>main gas</u> line and the desorption line are configured such that the stock of absorbent can be swept with the desorbing gas in a cocurrent manner with respect to a flow direction of the mixture of the secondary gas and the adjacent gas.

28.  The plant as claimed in claim 25, wherein the [adsorption] <u>main gas</u> line and the desorption line are configured such that the stock of absorbent can be swept with the desorbing gas in a countercurrent manner with respect to a flow direction of the mixture of the secondary gas and the adjacent gas.

Signed and Sealed this

Thirty-first Day of August, 1999

Attest:

Q. TODD DICKINSON

*Attesting Officer*   *Acting Commissioner of Patents and Trademarks*